US012454857B2

(12) United States Patent
Li

(10) Patent No.: US 12,454,857 B2
(45) Date of Patent: Oct. 28, 2025

(54) SMART BARN DOOR, CONTROL METHOD AND DEVICE APPLIED TO THE SMART BARN DOOR, AND COMPUTER- READABLE STORAGE MEDIUM

(71) Applicant: SHENZHEN NOVILAND TECHNOLOGY CO., LTD, Shenzhen (CN)

(72) Inventor: Hao Li, Shenzhen (CN)

(73) Assignee: SHENZHEN NOVILAND TECHNOLOGY CO., LTD, Shenzhen (CN)

( * ) Notice: Subject to any disclaimer, the term of this patent is extended or adjusted under 35 U.S.C. 154(b) by 51 days.

(21) Appl. No.: 18/422,001

(22) Filed: Jan. 25, 2024

(65) Prior Publication Data

US 2024/0200389 A1 Jun. 20, 2024

Related U.S. Application Data

(63) Continuation of application No. PCT/CN2022/108716, filed on Jul. 28, 2022.

(30) Foreign Application Priority Data

Jul. 29, 2021 (CN) ......................... 202110863112.X

(51) Int. Cl.
*E05F 15/77* (2015.01)
*E05F 15/643* (2015.01)

(52) U.S. Cl.
CPC ............ *E05F 15/77* (2015.01); *E05F 15/643* (2015.01); *E05Y 2400/354* (2013.01); *E05Y 2900/132* (2013.01)

(58) Field of Classification Search
CPC ....... E05Y 2900/132; E06B 5/00; E05F 15/77
See application file for complete search history.

(56) References Cited

U.S. PATENT DOCUMENTS

2011/0225885 A1* 9/2011 Van Tassell, III ...... E05F 15/60
49/25
2021/0214987 A1* 7/2021 Thouin ................. E05D 15/165

FOREIGN PATENT DOCUMENTS

| | | | |
|---|---|---|---|
| CA | 2713608 | A1 | 1/2012 |
| CN | 102691461 | A | 9/2012 |
| CN | 105525799 | A | 4/2016 |

(Continued)

*Primary Examiner* — Thomas S Mccormack
(74) *Attorney, Agent, or Firm* — Bayramoglu Law Offices LLC

(57) ABSTRACT

A smart barn door includes a door body, a controller, a driving device, a roller, and a track. The driving device and the roller are fixedly connected to the door body. The driving device is used to drive the roller to roll and to move along the track. When the roller moves along the track, the roller drives the door body to move accordingly. The controller is used to control an operating status of the driving device. The controller is provided with a wireless communication port. The wireless communication port is used to acquire a wireless control signal to remotely control the door body to move. A control method applied to the smart barn door includes the following steps: acquiring the wireless control signal; detecting an operation instruction corresponding to the wireless control signal; and controlling, by the controller, the driving device to operate according to the operation instruction.

8 Claims, 11 Drawing Sheets

(56) References Cited

FOREIGN PATENT DOCUMENTS

| | | | |
|---|---|---|---|
| CN | 205314816 | U | 6/2016 |
| CN | 205314821 | U | 6/2016 |
| CN | 106150283 | A | 11/2016 |
| CN | 107780781 | A | 3/2018 |
| CN | 109025689 | A | 12/2018 |
| CN | 209429913 | U | 9/2019 |
| CN | 110956727 | A | 4/2020 |
| CN | 111188559 | A | 5/2020 |
| CN | 111219118 | A | 6/2020 |
| CN | 210768479 | U | 6/2020 |
| CN | 113550681 | A | 10/2021 |
| CN | 215804030 | U | 2/2022 |

* cited by examiner

SMART BARN DOOR, CONTROL METHOD AND DEVICE APPLIED TO THE SMART BARN DOOR, AND COMPUTER- READABLE STORAGE MEDIUM

CROSS REFERENCE TO THE RELATED APPLICATIONS

This application is the continuation application of International Application No. PCT/CN2022/108716, filed on Jul. 28, 2022, which is based upon and claims priority to Chinese Patent Application No. 202110863112.X, filed on Jul. 29, 2021, the entire contents of which are incorporated herein by reference.

TECHNICAL FIELD

The present disclosure relates to the technical field of barn doors, and in particular to a smart barn door, a control method and device applied to the smart barn door, and a computer-readable storage medium.

BACKGROUND

In daily life, the interior space of a house is usually divided into different areas for different purposes. One of the methods used to divide the areas is to set up doors, such that the areas, such as the kitchen and the living room, as well as the bedroom and the living room, are separated and connected by using these doors.

Most of the existing doors are manually pushed to open and close, each entry and exit requires manual pushing, which does not conform to the concept of smart furniture and may cause inconvenience, especially for the elderly or disabled in wheelchairs at home.

Therefore, to solve the above problem, it is desirable to develop a smart barn door that can be opened and closed smartly, a control method and device applied to the smart barn door, and a computer-readable storage medium.

SUMMARY

The present disclosure provides a smart barn door, a control method and device applied to the smart barn door, and a computer-readable storage medium to solve the technical problem mentioned in the background.

The present disclosure first provides a smart barn door; the smart barn door includes a door body, a controller, a driving device, a roller, and a track, the driving device and the roller are fixedly connected to the door body; the driving device is used to drive the roller to roll and to move along the track; when the roller moves along the track, the roller drives the door body to move accordingly; the controller is used to control an operating status of the driving device, and the controller is provided with a wireless communication port; the wireless communication port is used to acquire a wireless control signal to remotely control the door body to move.

Further, a portion of the roller in contact with the track is provided with a textured structure; and the textured structure is used to increase a frictional force between the roller and the track, so as to improve movement stability of the door body.

Further, the smart barn door further includes a tank chain; the controller is connected to an external power supply by a wire; the wire is connected to the controller through the tank chain; and the tank chain is used to conceal and normatively arrange the wire.

Further, the smart barn door further includes a Hall sensor, first magnet, and second magnets; the Hall sensor is electrically connected to the controller and the Hall sensor moves with the door body; the second magnet is located at an endpoint of a route passed by the Hall sensor; there is a distance between the first magnet and the endpoint of the route passed by the Hall sensor; when the Hall sensor senses the first magnet during moving from the first magnet to the second magnet, the controller controls the driving device to decelerate; and when the Hall sensor senses the second magnet, the controller controls the driving device to stop.

The present disclosure further provides a control method, which is applied to a smart barn door; the smart barn door includes a door body, a controller, a driving device, a roller, and a track, the driving device and the roller are fixedly connected to the door body; the driving device is used to drive the roller to roll and to move along the track; when the roller moves along the track, the roller drives the door body to move accordingly; the controller is used to control an operating status of the driving device, and the controller is provided with a wireless communication port; the wireless communication port is used to acquire a wireless control signal to remotely control the door body to move; the control method includes the following steps:

- acquiring the wireless control signal;
- detecting an operation instruction corresponding to the wireless control signal; and
- controlling, by the controller, the driving device to operate according to the operation instruction.

Further, the smart barn door includes a voice pickup device electrically connected to the controller, the voice pickup device is used to acquire a sound; a preset voice instruction packet is stored in the controller, with each piece of voice information corresponding to a control mode; and the control method further includes:

- acquiring sound data information;
- comparing the acquired sound data information with the stored voice instruction packet; and
- controlling, by the controller, the driving device to operate according to a corresponding control mode if the acquired sound data information matches at least one piece of information in the voice instruction packet.

Further, the smart barn door further includes a Hall sensor, first magnets, and second magnets; the Hall sensor is electrically connected to the controller and the hall sensor moves with the door body; the second magnet is located at an endpoint of a route passed by the Hall sensor; there is a distance between the first magnet and the endpoint of the route passed by the Hall sensor; each time the Hall sensor passes through the first magnet or the second magnet, a mark signal is generated and stored; the control method further includes a buffering step:

- controlling, by the controller, the driving device to stop when a second mark signal is detected, where the second mark signal is generated when the Hall sensor passes through the second magnet;
- acquiring last detected signal information when a first mark signal is detected, where the first mark signal is generated when the Hall sensor passes through the first magnet; and
- controlling, by the controller, the driving device to decelerate if the last detected signal information is the first mark signal.

The present disclosure further provides a control device, which is applied to a smart barn door; the smart barn door includes a door body, a controller, a driving device, a roller, and a track, where the driving device and the roller are fixedly connected to the door body; the driving device is used to drive the roller to roll and to move along the track; when the roller moves along the track, the roller drives the door body to move accordingly; the controller is used to control an operating status of the driving device; the controller is provided with a wireless communication port; the wireless communication port is used to acquire a wireless control signal to remotely control the door body to move; and the control device includes:

- a first acquisition module, configured to acquire the wireless control signal;
- a detection module, configured to detect an operation instruction corresponding to the wireless control signal; and
- an execution module, configured to control, by the controller, the driving device to operate according to the operation instruction.

Further, the smart barn door further includes a Hall sensor, first magnets, and second magnets; the Hall sensor is electrically connected to the controller and the Hall sensor moves with the door body; the second magnet is located at an endpoint of a route passed by the Hall sensor; there is a distance between the first magnet and the endpoint of the route passed by the Hall sensor; each time the Hall sensor passes through the first magnet or the second magnet, a mark signal is generated and stored; the control device further includes:

- a first control module, configured to control, by the controller, the driving device to stop when a second mark signal is detected, where the second mark signal is generated when the Hall sensor passes through the second magnet;
- a second acquisition module, configured to acquire last detected signal information when a first mark signal is detected, where the first mark signal is generated when the Hall sensor passes through the first magnet; and
- a second control module, configured to control, by the controller, the driving device to decelerate if the last detected signal information is the first mark signal.

The present disclosure further provides a computer-readable storage medium, on which a computer program is stored, when the computer program is processed and executed, the control method applied to the smart barn door is implemented.

The smart barn door provided by the present disclosure is provided with a controller inside the smart barn door. The controller controls the operating status of the driving device, and is provided with a wireless communication port. The wireless communication port is used to receive a wireless control signal that may be generated by various means such as a voice instruction, a remote control, and an application (app). The opening and closing control of the track of the barn door may thus be completed, and it adapts to various usage needs in daily life scenarios, provides convenience for people's lives, fills the gap in the category of doors in smart homes, and truly links doors with other functional furniture, thereby achieving smart control of doors.

The control method provided by the present disclosure acquires the received wireless control signal to control the driving device according to the operation instruction corresponding to the wireless control signal, thereby achieving the opening or closing of the door by wireless control, and achieving intelligence, securitization and convenient.

It should be understood that the above general description and the following detailed description are only exemplary and explanatory, and should not be construed as a limitation to the present disclosure.

DETAILED DESCRIPTION OF THE EMBODIMENTS

Figure 1:
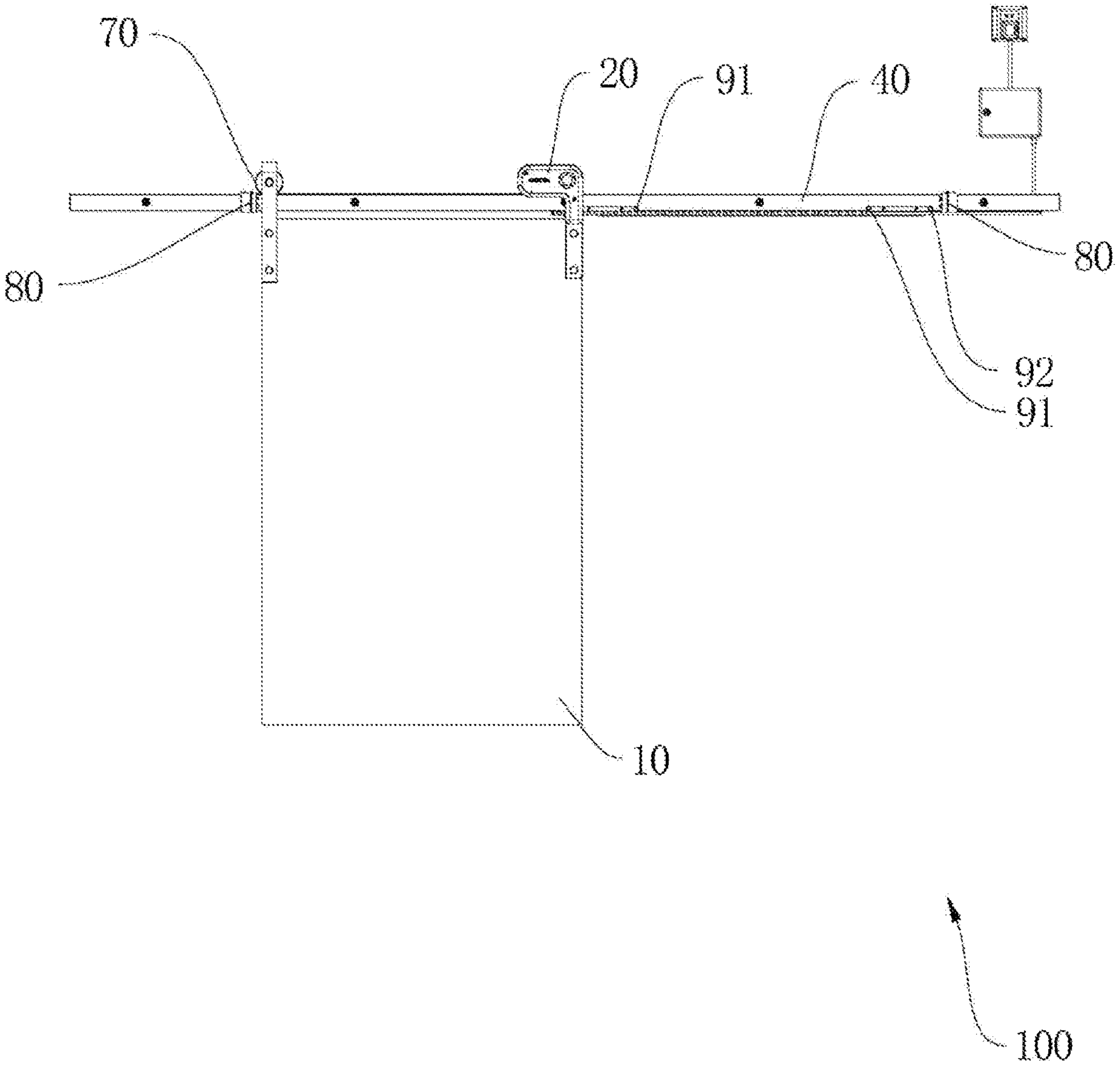
FIG. 1 is an overall structural diagram of a smart barn door according to an embodiment provided by the present disclosure.

The embodiments of the present disclosure are described below in detail. Examples of the embodiments are shown in the drawings. The same or similar numerals represent the same or similar elements or elements having the same or similar functions throughout the specification. The embodiments described below with reference to the drawings are exemplary, and are only used to explain the present disclosure but should not be construed as a limitation to the present disclosure.

Those skilled in the art should understand that unless otherwise stated, the singular forms "a", "an", "said", and "the" used herein may cover plural forms. It should be further understood that the wording of "including" used in the specification of the present disclosure refers to the presence of the described features, integers, steps, and operations, but does not exclude the presence or addition of one or more other features, integers, steps, and operations.

Those skilled in the art should understand that unless otherwise defined, all terms (including technical terms and scientific terms) used herein have the same meanings as those commonly understood by those of ordinary skilled in the art to which the present disclosure belongs. It should also be understood that terms such as those defined in general dictionaries should be understood as having meanings consistent with the meanings in the context of the prior art, and unless otherwise specifically defined herein, these terms will not be explained in ideal or overly-formal meanings.

Those skilled in the art should understand that the concepts of "application (app)", "app program", "app software", and similar concepts in the present disclosure are the same concepts that are well-known to those skilled in the industry, which refer to computer software that is organically constructed from a series of computer instructions and related data resources and is suitable for electronic operation. Unless otherwise specified, this naming is not limited by the type and level of a programming language or the operating system or platform on which it depends to run. Of course, such concepts are not limited by any form of terminal.

Those skilled in the art should understand that the user interface or display interface in the present disclosure generally refers to a display interface that can be used to send control instructions to an intelligent terminal. For example, it can be an option (or button, added by the app program, the same below) on the settings page of the Android/iOS/Windows Phone system, or an option in the notification bar or interactive pages that pops up from the desktop, or an option in a page constructed by an active component of the app program.

Referring to FIG. 1, the present disclosure first provides a smart barn door 100. the smart barn door includes a door body 10, a controller, driving device 20, roller 30, and track 40. The driving device 20 and the roller 30 are fixedly connected to the door body 10. The driving device 20 is used to drive the roller 30 to roll and to move along the track 40. When the roller 30 moves along the track 40, the roller 30 drives the door body 10 to move accordingly. The controller is used to control an operating status of the driving device 20, and the controller is provided with a wireless communication port. The wireless communication port is used to acquire a wireless control signal to remotely control the door body 10 to move.

In this embodiment, the smart barn door 100 is provided with a controller inside. The controller controls the operating status of the driving device 20, and is provided with a wireless communication port. The wireless communication port is used to receive a wireless control signal that may be generated by various means such as a voice instruction, a remote control, and an app, in order to complete the opening and closing control of the track 40 of the barn door, which adapts to various usage needs in daily life scenarios, provides convenience for people's lives, fills the gap in the category of doors in smart homes, and truly links doors with other functional furniture, thereby achieving smart control of doors.

In an embodiment of the present disclosure, the smart barn door 100 further includes a Hall sensor, first magnets 91, and second magnets 92. The Hall sensor is electrically connected to the controller and the Hall sensor moves with the door body 10. The second magnet 92 is located at an endpoint of a route passed by the Hall sensor. There is a distance between the first magnet 91 and the endpoint of the route passed by the Hall sensor. When the Hall sensor senses the first magnet 91 during moving from the first magnet 91 to the second magnet 92, the controller controls the driving device 20 to decelerate. When the Hall sensor senses the second magnet 92, the controller controls the driving device 20 to stop.

Preferably, the smart barn door 100 includes two sets of first magnets 91 and second magnets 92, one set provided at one side of the endpoint of a route from left to right, and the other set provided at one side of the endpoint of a route from right to left.

Preferably, the smart barn door 100 further includes driven wheel 70. The roller 30 is connected to one side of a direction of movement of the door body 10, and the driven wheel 70 is connected to the other side. When the roller 30 drives the door body 10 to move, the driven wheel 70 rolls accordingly. In this embodiment, the movement stability of the door body 10 is improved by setting the driven wheel 70.

Figure 2:
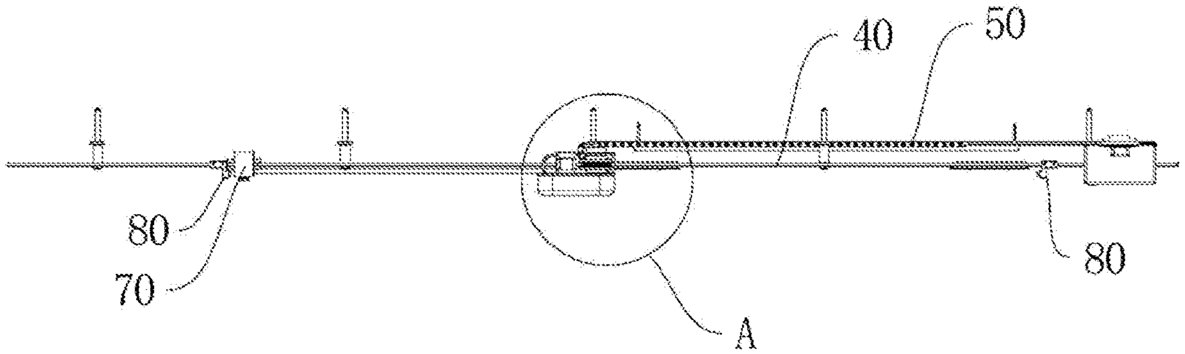
FIG. 2 is a top view of the embodiment shown FIG. 1.
Figure 3:
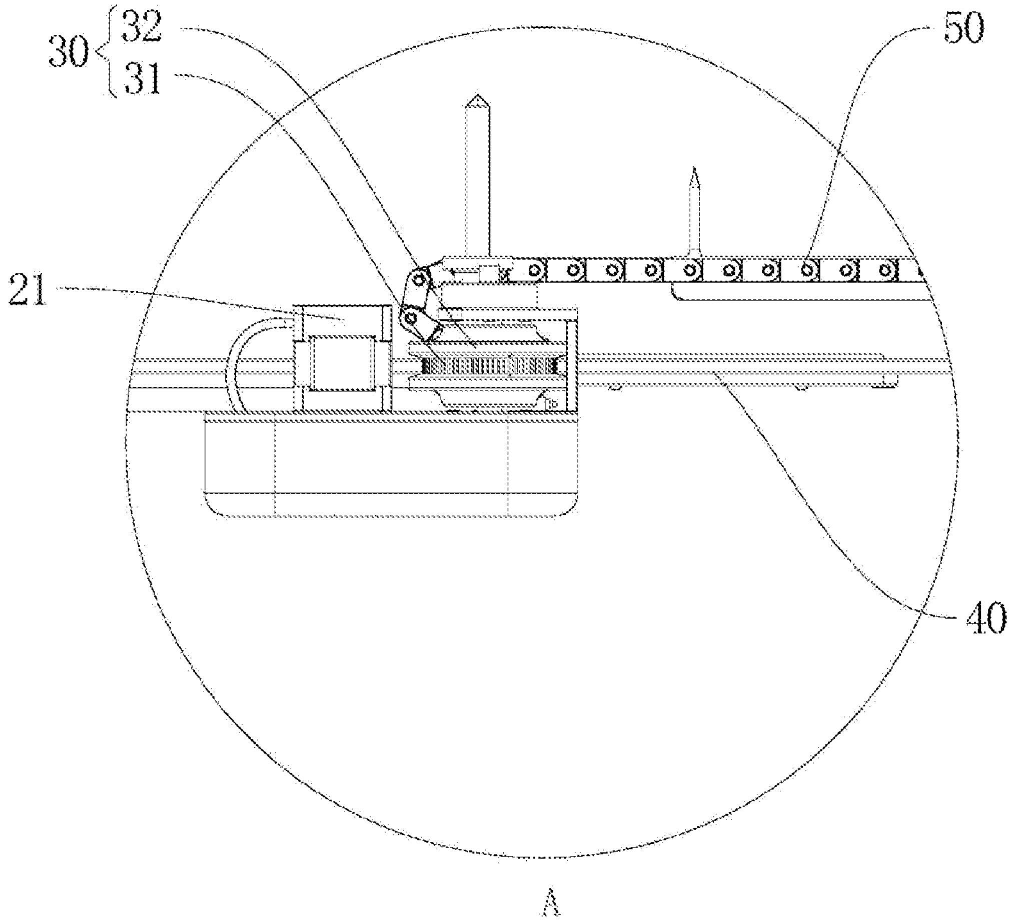
FIG. 3 is a partial enlarged view of circle A shown in FIG. 2.

Referring to FIGS. 2 and 3, the driving device 20 includes driving motor 21 and a belt transmission mechanism. An output terminal of the driving motor 21 is connected to the roller 30 through the belt transmission mechanism.

Specifically, the roller 30 includes hub 31 and flanges 32 arranged on both sides of the hub 31. The hub 31 is in contact with the track 40. The flanges 32 are used to limit the roller 30 so as to prevent the roller from deviating from the track 40.

Preferably, the roller 30 is provided with a textured structure. The textured structure is used to increase a frictional force between the roller 30 and the track 40.

Preferably, the track 40 is further provided with a limiting element 80. The limiting element 80 is used to limit a maximum travel range of the door body 10.

In this embodiment, the controller is provided with a voice pickup module. The voice pickup module is used to acquire environmental sounds and recognize whether it is a preset control voice, so as to control the driving device 20 according to a preset voice and mode.

Figure 4:
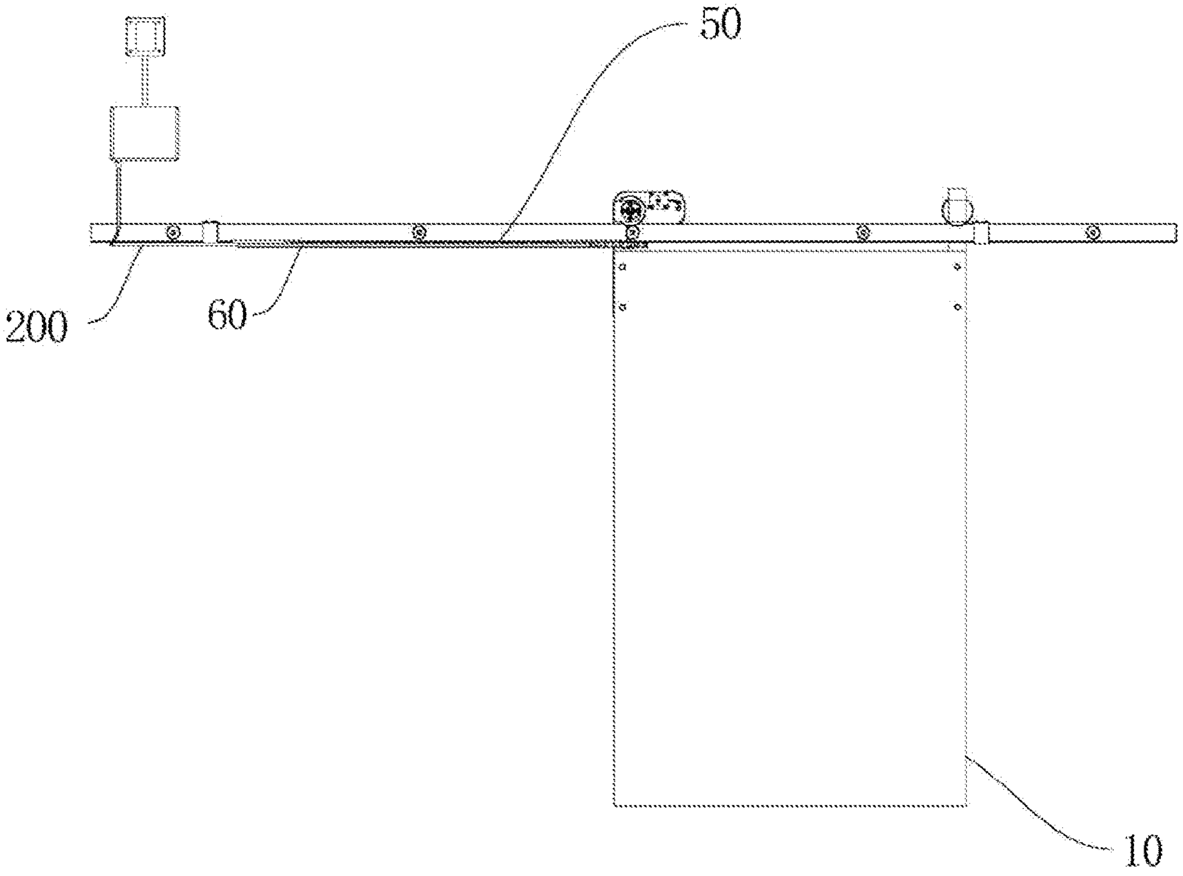
FIG. 4 is a back view of the embodiment shown in FIG. 1.

Referring to FIG. 4, the smart barn door 100 further includes a tank chain 50. The controller is connected to an external power supply by wire 200. The wire 200 passes through the tank chain 50 for concealment.

Further, the smart barn door 100 includes accommodation plate 60. The accommodation plate 60 is used to support the tank chain 50 to prevent the tank chain 50 from falling to hit a person, thereby improving safety.

Figure 8:
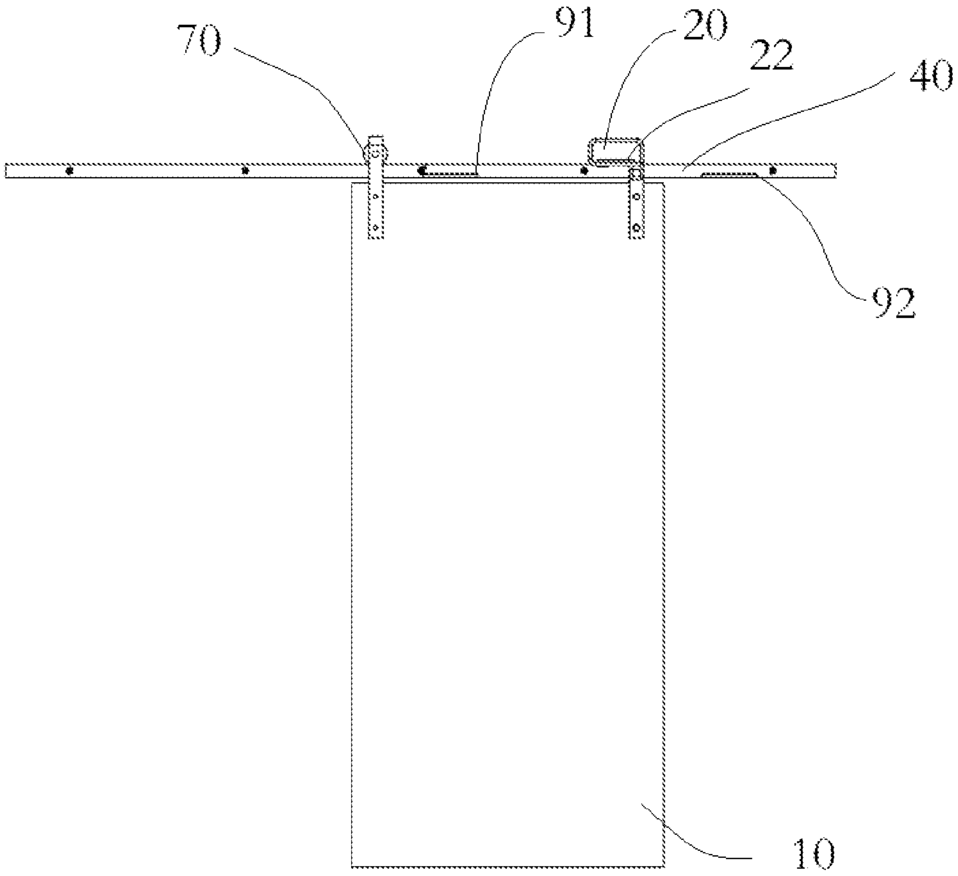
FIG. 8 is an overall structural diagram of the smart barn door according to yet another implementation of the present disclosure.
Figure 9:
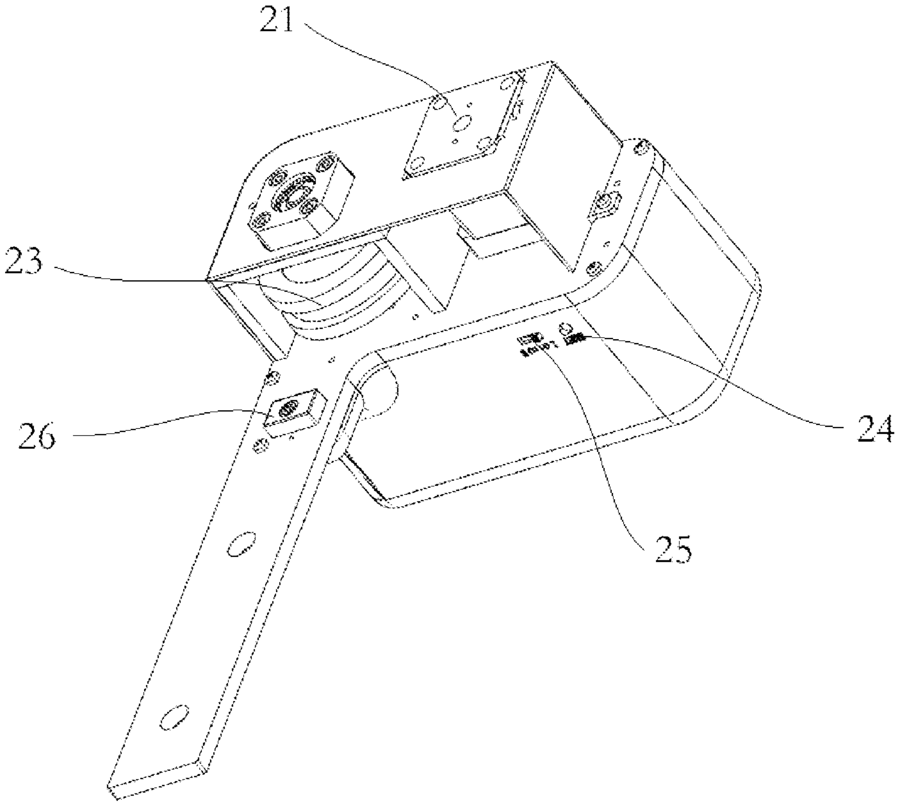
FIG. 9 is a structural diagram of the driving device in the implementation shown in FIG. 8 of the present disclosure.
Figure 10:
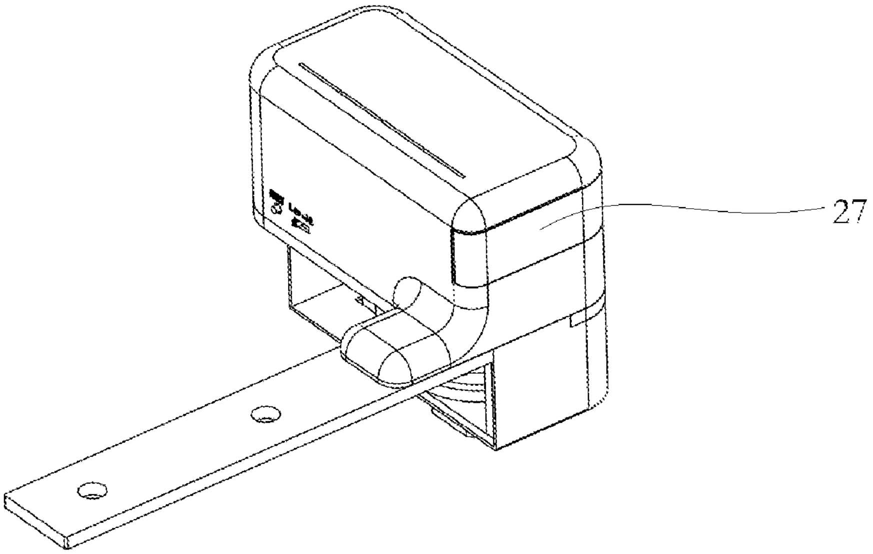
FIG. 10 is a structural diagram of the driving device in the implementation shown in FIG. 8 of the present disclosure from another perspective.
Figure 11:
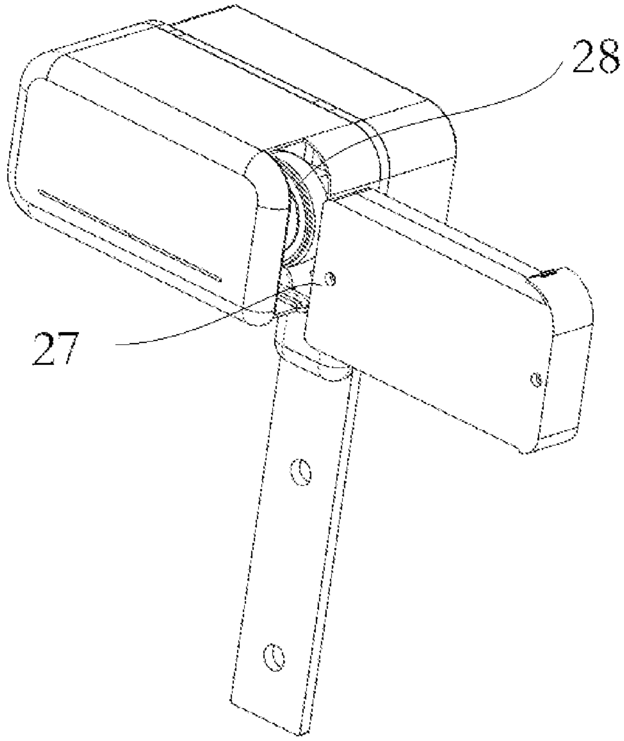
FIG. 11 is a structural diagram of the driving device shown in FIG. 10 with a battery compartment being pulled out.

Optionally, referring to FIGS. 8 and 9, FIGS. 8 and 9 show another implementation of the smart barn door 100, in which the tank chain is not necessarily provided in this structure. Specifically, it is provided with a smart gateway and gateway pairing button 24, and further provided with an operating status indicator light bar 22, an infrared remote control receiving device, and a door control infrared remote controller. As shown in FIG. 9, the driving device 20 is provided with a driving motor 21, the operating status indicator light bar 22, the driving wheel 23, the gateway pairing button 24, a moving direction selection switch 25, and the Hall sensor 26. As shown in FIGS. 10 and 11, the driving device 20 is further provided with battery compartment 27 and variable speed pulley group 28 so as to be powered through a battery.

Among others, the door control infrared remote controller is set separately from the smart barn door 100 or it can be portable. The infrared remote control receiving device is provided on the smart barn door 100. The door control infrared remote controller and the infrared remote control receiving device may cooperate with each other. Similarly, the smart gateway is set separately from the smart barn door 100. The gateway pairing button 24 is provided on the smart barn door 100. The smart gateway and the gateway pairing button 24 may cooperate with each other. The moving direction selection switch 25 is provided on the driving device 20. The operating status indicator light bar 22 is located close to the moving direction selection switch 25.

In this way, the smart barn door 100 can be remotely controlled through infrared remote control, making it convenient for the user to operate and use. Network connection management may be carried out through the gateway to ensure smooth communication between various components. Meanwhile, the operating status of the door body may be visually displayed through different colors and display statuses of a status indicator light. The moving direction of the door body can be selected to control the size of a door slot.

It should be noted that wireless data transmission of communication components such as a door body control device can be implemented through a repeater, so as to amplify a signal and ensure effective signal transmission.

In an embodiment of the present disclosure, the smart barn door 100 is provided with one door body 10, and the door body 10 is driven by the driving device 20 to move to be opened or closed.

Figure 5:
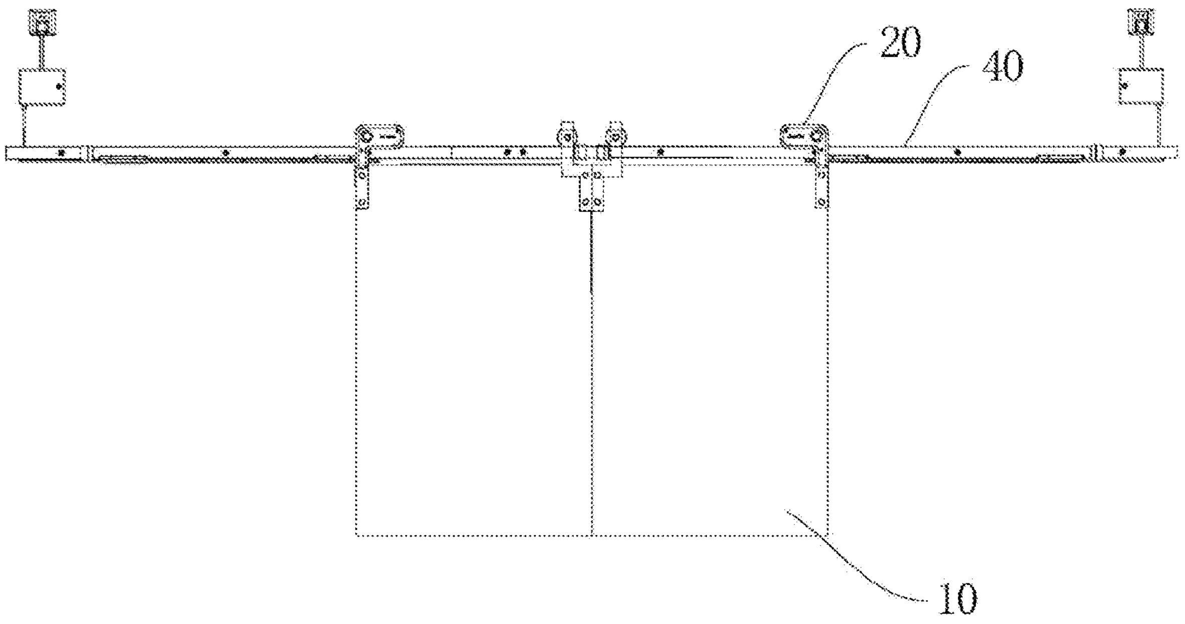
FIG. 5 is an overall structural diagram of the smart barn door according to another implementation of the present disclosure.
Figure 6:
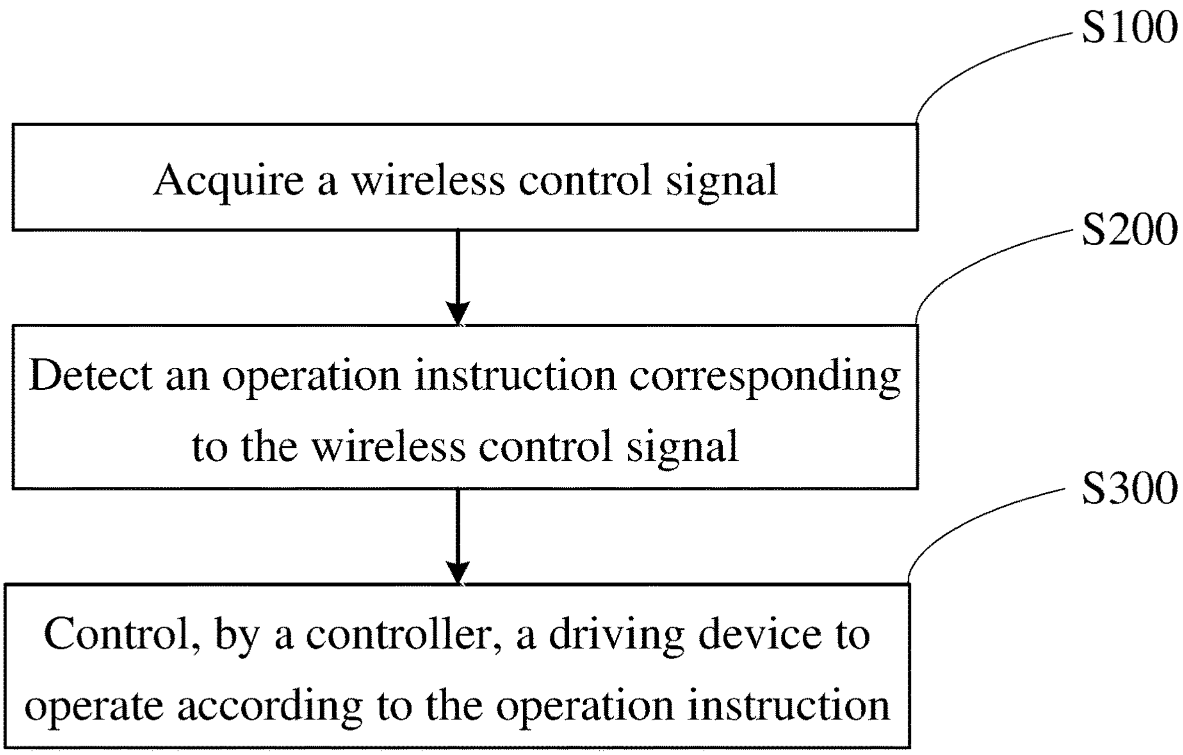
FIG. 6 is a process flowchart of a control method applied to a smart barn door according to an embodiment of the present disclosure.

In other embodiments, referring to FIG. 5, the smart barn door 100 includes two door bodies 10. The two door bodies 10 move in opposite directions. The two door bodies 10 move towards each other to close under the control of the controller, and the two door bodies 10 move away from each other to open under the control of the controller.

The present disclosure further provides a control method, which is applied to the smart barn door 100. The smart barn door 100 includes a door body 10, a controller, driving device 20, roller 30, and track 40. The driving device 20 and the roller 30 are fixedly connected to the door body 10. The driving device 20 is used to drive the roller 30 to roll and to move along the track 40. When the roller 30 moves along the track 40, the roller drives the door body 10 to move accordingly. The controller is used to control an operating status of the driving device 20, and the controller is provided with a wireless communication port. The wireless communication port is used to acquire a wireless control signal to remotely control the door body 10 to move. The control method includes the following steps:

S100. Acquiring the wireless control signal.

In real life, typically, the user can send the wireless control signal from a distance by means of remote control, Bluetooth, and app, etc., and each wireless control signal corresponds to an operation instruction (such as the instruction of opening or closing the door). This wireless control method for door opening and closing eliminates the manual pushing step and reduces the mandatory requirements for opening the door. In this way, even the elderly or disabled in wheelchairs can easily control the door through the above method, thereby improving their quality of life.

S200. Detecting an operation instruction corresponding to the wireless control signal.

S300. Controlling, by the controller, the driving device to operate according to the operation instruction.

When the wireless control signal is acquired, the controller operates based on the received wireless control signal. For example, when receiving a wireless control signal to "open the door", the controller controls the driving device to drive the roller, thereby driving the door body to move and open the door. When receiving a wireless control signal to "close the door", the controller controls the driving device to drive the roller, thereby driving the door body to move and close the door.

In summary, through the controller and the wireless communication port, the wireless control signal can be acquired to control the driving device 20 according to an operation instruction corresponding to the wireless control signal, thereby achieving the opening or closing of door by wireless control, and achieving intelligence, securitization and convenient of the opening and closing function of the barn door. This control method may adapt to various usage needs in daily life scenarios and provide convenience for people's lives.

Specifically, in an embodiment of the present disclosure, the control method further includes the following step:

Acquiring sound data information.

Specifically, the smart barn door 100 further includes a voice pickup device electrically connected to the controller, the voice pickup device is used to acquire a sound. A preset voice instruction packet is stored in the controller, with each piece of voice information corresponding to a control mode (a sound "opening the door" corresponds to an operation of opening the door, while a sound "closing the door" corresponds to an operation of closing the door).

Comparing the acquired sound data information with the stored voice instruction packet.

Specifically, the acquired sound data information is compared with the stored voice instruction packet to effectively filter out noise or interference and accurately identify whether there is an intention to control the smart barn door 100.

The controller controls the driving device to operate according to a corresponding control mode if the acquired sound data information matches at least one piece of information in the voice instruction packet.

In this embodiment, when the acquired sound data information matches at least one piece of information in the voice instruction packet, it means that the user has an intention of controlling the smart barn door 100. By this time, the controller executes a control mode corresponding to the sound data information to achieve the user's intention. If the acquired sound data information does not match any information in the voice instruction packet, it is considered as a invalid sound and the user has no intention of controlling the smart barn door 100, and no action is required.

Further, the smart barn door 100 further includes a Hall sensor, first magnets 91, and second magnets 92. The Hall sensor is electrically connected to the controller and the Hall sensor moves with the door body 10. The second magnet 92 is located at an endpoint of a route passed by the Hall sensor. There is a distance between the first magnet 91 and the endpoint of the route passed by the Hall sensor. Each time the Hall sensor passes through the first magnet 91 or the second magnet 92, a mark signal is generated and stored. The control method further includes a buffering step:

Controlling, by the controller, the driving device to stop when a second mark signal is detected, where the second mark signal is generated when the Hall sensor passes through the second magnet.

In this solution, it should be understood that the second magnet 92 is located at the endpoint of the route that is a route from the first magnet 91 to the second magnet 92. When the Hall sensor detects the second mark signal, it means that the route reaches the endpoint and needs to be stopped.

Acquiring last detected signal information when a first mark signal is detected, where the first mark signal is generated when the Hall sensor passes through the first magnet 91.

Controlling, by the controller, the driving device to decelerate if the last detected signal information is the first mark signal.

In this solution, when the door moves from the first magnet 91 to the second magnet 92, it needs to decelerate when it passes through the first magnet 91, if the last detected signal information is the first mark signal (i.e. the last passed mark point is the first magnet 91). Thus, the speed of the door body 10 decreases during the route from the first magnet 91 to the second magnet 92, achieving soft closing and avoiding damage to the door body 10 due to fast opening and closing. When the first mark signal is detected, and the last detected signal information is the second mark signal, it means that the current movement direction of the door body is from the second magnet 92 to the first magnet 91 and the door only needs to move normally.

In this solution, the control method may further be another implementation below.

When the door body 10 is opened, the Hall sensor is controlled to sequentially acquire a first sensing signal and a second sensing signal according to a first preset time interval.

If the second sensing signal is the second mark signal, the controller controls the driving device 20 to stop.

If the second sensing signal is the first mark signal, the controller controls the driving device 20 to decelerate.

In a specific embodiment, the smart barn door 100 further includes a Hall sensor, first magnets 91, and second magnets 92. The Hall sensor is electrically connected to the controller and the Hall sensor moves with the door body 10. The second magnet 92 is located at an endpoint of a route passed by the Hall sensor. There is a distance between the first magnet 91 and the endpoint of the route passed by the Hall sensor. When the Hall sensor senses the first magnet 91 during moving from the first magnet 91 to the second magnet 92, the controller controls the driving device 20 to decelerate. When the Hall sensor senses the second magnet 92, the controller controls the driving device 20 to stop.

Therefore, when the door body 10 is opened, the driving device 20 can be controlled to stop in a timely manner, and the driving device 20 can be controlled to buffer and decelerate in a timely manner, so as to prevent damage to the door body caused by collision.

Preferably, the control method further includes the following steps.

When door body 10 is closed, the Hall sensor is controlled to sequentially acquire a third sensing signal and a fourth sensing signal according to a second preset time interval.

When the fourth sensing signal is the first mark signal, the controller controls the driving device 20 to stop.

When the fourth sensing signal is the second mark signal, the controller controls the driving device 20 to decelerate.

Similarly, when the door body 10 is closed, the driving device 20 can be controlled to stop in a timely manner, and the driving device 20 can be controlled to buffer and decelerate in a timely manner, so as to prevent damage to the door body caused by collision, or to prevent accidents such as injury to personnel caused by closing the door too quickly.

In another preferred implementation, the smart barn door 100 further includes a door frame and the limiting element 80. The track 40 is located on the door frame. The limiting element 80 is located on the door frame and at one side of the first magnet 91 away from the second magnet 92.

If the fourth sensing signal is the second mark signal, the controller controls the driving device 20 to decelerate. The control method further includes the following step:

The limiting element 80 is controlled to block the movement of the door body 10.

In a specific embodiment, the door frame is further provided with the limiting element 80. The limiting element 80 is used to limit the maximum travel range of the door body 10.

In this way, the door body can be prevented from closing in a timely manner through hardware so as to prevent accidents such as injury to personnel in case of electrical failure.

In a further preferred implementation, the first magnet 91 is located on the door frame and at a center of the route of the door body 10. The second magnet 92 is located on the door frame and at the endpoint of the route of the door body 10.

In a specific embodiment, when the door body 10 is moved to half of the route, the buffering measure can be activated to ensure that the door body 10 is buffered and decelerated, avoiding various collision or pinch accidents.

Further, since the above-mentioned technical solution includes the following implementation that: the smart barn door 100 includes two sets of first magnets 91 and second magnets 92, one set provided at one side of the endpoint of the route from left to right, and the other set provided at one side of the endpoint of the route from right to left. Even if there is one set of mark points (the first magnet 91 and the second magnet 92) provided at each side, the driving device can still be controlled through the above signal detection method.

Specifically, there are two symmetrical door bodies 10. When door bodies 10 are closed, the two door bodies move towards each other. When door bodies 10 are opened, the two door bodies move away from each other. As shown in FIG. 5, in a specific embodiment, the smart barn door 100 includes two door bodies 10, and the two door bodies 10 move in opposite directions. The two door bodies 10 move towards each other to close under the control of the controller, and the two door bodies 10 move away from each other to open under the control of the controller.

In an embodiment, the present disclosure provides a control device 300, which is applied to the smart barn door 100. The smart barn door 100 includes door body 10, a controller, driving device 20, roller 30, and track 40. The driving device 20 and the roller 30 are fixedly connected to the door body 10. The driving device 20 is used to drive the roller 30 to roll and to move along the track 40. When the roller 30 moves along the track 40, the roller drives the door body 10 to move accordingly. The controller is used to control an operating status of the driving device 20, and the controller is provided with a wireless communication port. The wireless communication port is used to acquire a wireless control signal to remotely control the door body 10 to move. Multiple instructions are stored in the control device and are suitable to be loaded and executed by a processor to implement a control method. The control method includes:

S100. Acquiring the wireless control signal.

S200. Detecting an operation instruction corresponding to the wireless control signal.

S300. Controlling, by the controller, the driving device to operate according to the operation instruction.

Figure 7:
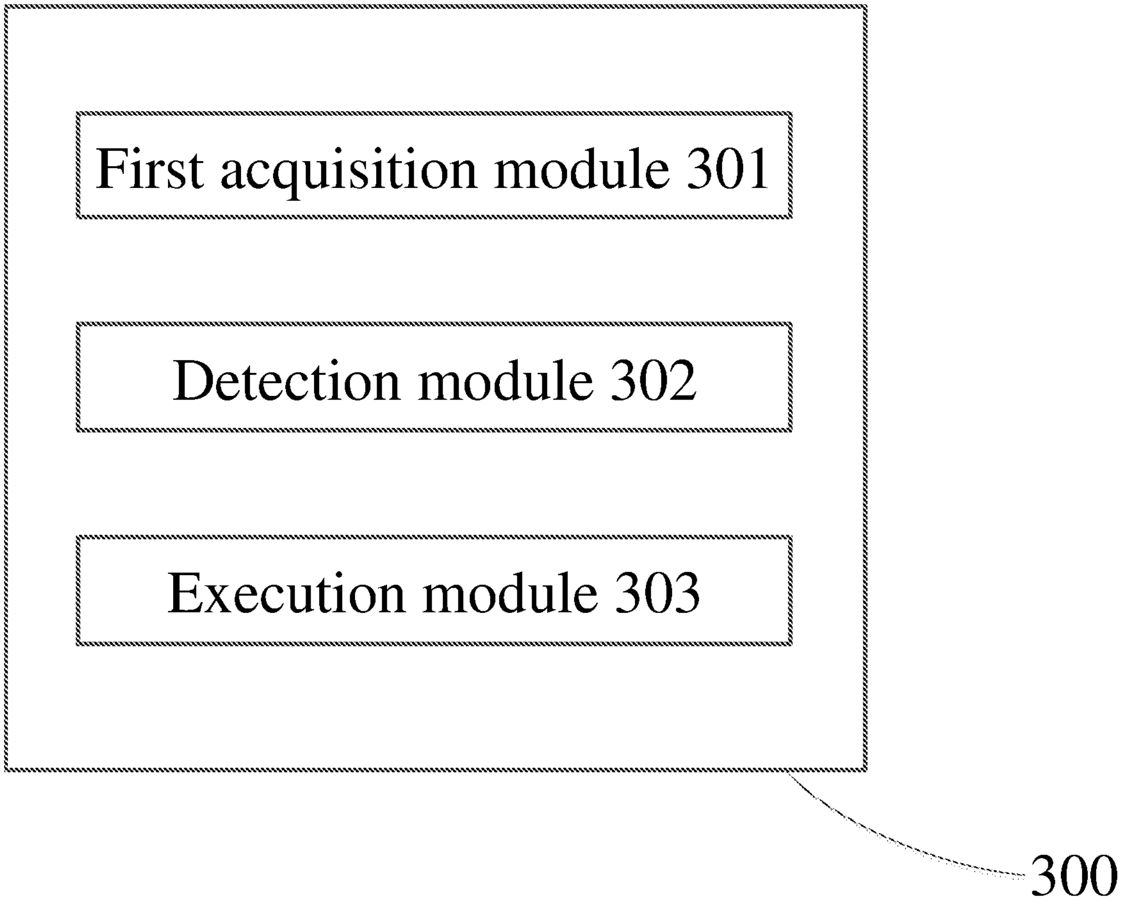
FIG. 7 is a module diagram of a control device applied to a smart barn door according to an embodiment of the present disclosure.

For ease of description, as shown in FIG. 7, the control device 300 is divided into functional module architecture, which include:

The first acquisition module 301, which is configured to acquire the wireless control signal.

The detection module 302, which is configured to detect an operation instruction corresponding to the wireless control signal.

The execution module 303, which is configured to control, by the controller, the driving device to operate according to the operation instruction.

Specifically, in an embodiment of the present disclosure, the smart barn door 100 further includes a Hall sensor, first magnets 91, and second magnets 92. The Hall sensor is electrically connected to the controller and the Hall sensor moves with the door body 10. The second magnet 92 is located at an endpoint of a route passed by the Hall sensor. There is a distance between the first magnet 91 and the endpoint of the route passed by the Hall sensor. Each time the Hall sensor passes through the first magnet 91 or the second magnet 92, a mark signal is generated and stored. The control device 300 further includes:

A first control module, which is configured to control, by the controller, the driving device to stop when a second mark signal is detected, where the second mark signal is generated when the Hall sensor passes through the second magnet.

A second acquisition module, which is configured to acquire last detected signal information when a first mark signal is detected, where the first mark signal is generated when the Hall sensor passes through the first magnet.

A second control module, which is configured to control, by the controller, the driving device to decelerate if the last detected signal information is the first mark signal.

Specifically, in an embodiment of the present disclosure, the smart barn door 100 further includes a voice pickup device electrically connected to the controller, the voice pickup device is used to acquire a sound. A preset voice instruction packet is stored in the controller, with each piece of voice information corresponding to a control mode. The control device 300 further includes:

A sound acquisition module, which is configured to acquire sound data information.

A comparison module, which is configured to compare the acquired sound data information with the stored voice instruction packet.

A voice control module, which is configured to control, by the controller, the driving device to operate according to a corresponding control mode if the acquired sound data information matches at least one piece of information in the voice instruction packet.

The present disclosure further provides a computer-readable storage medium, on which a computer is stored, and when the computer program is processed and executed, the control method applied to the smart barn door 100 is implemented.

If the module/unit integrated in the electronic device is implemented in the form of a software functional unit, and is sold or used as a stand-alone product, it may be stored in one computer-readable storage medium. Based on such an understanding, all or some of processes for implementing the app multi-starting method in the above embodiment of the present disclosure can be completed by the computer program instructing relevant hardware. The computer program may be stored in one computer-readable storage medium. The steps of the control method for the smart barn door in the above embodiment of method can be implemented when the computer program is executed by a processor. The computer program includes computer program code, and the computer program code may be in a form of source code, object code, executable file, or in some intermediate forms, etc. The computer-readable medium may include: any physical entity or apparatus capable of carrying the computer program code, a recording medium, a universal serial bus (USB) flash disk, a mobile hard disk drive, a magnetic disk, an optical disc, a computer memory, a read-only memory (ROM), a random access memory (RAM), an electrical carrier signal, a telecommunications signal, and a software distribution medium, etc. It should be noted that, the content in the computer-readable medium may be added or deleted properly according to the legislation and the requirements for patent practice in the jurisdiction. For example, in some jurisdictions, depending on the legislation and the patent practice, the computer-readable medium may not include the electrical carrier signal or the telecommunications signal.

In the specification and claims of the present disclosure, terms "include/comprise", "provided with/including", and variants thereof are used to refer to the presence of the stated features, numerical value, steps, or components, but do not exclude the presence or addition of one or more other features, numerical value, steps, components, or a group thereof.

For clarity, some features of the present disclosure are described in different embodiments. However, these features can also be combined to be described in a single embodiment. On the contrary, for simplicity, some features of the present disclosure are only described in a single embodiment. However, these features can also be described separately or in any suitable combination in different embodiments.

The specific implementations of the control method and control device applied to the smart barn door of the present disclosure are described in detail above. Finally, it should be noted that the above implementations are merely used to explain, rather than to limit the technical solutions of the present disclosure. Although the present disclosure is described in detail with reference to the above specific implementations, those of ordinary skilled in the art should understand that, without departing from the spirit of the technical solution of the present disclosure, modifications can be made to the specific implementations of the present disclosure, and equivalent substitutions can be made to some technical features of the present disclosure and such modifications and equivalent substitutions should be covered in the technical solution request to be protected of the present disclosure.

What is claimed is:

1. A smart barn door, comprising a door body, a controller, a driving device, a roller, and a track, wherein the driving device and the roller are fixedly connected to the door body; the driving device is used to drive the roller to roll and to move along the track; when the roller moves along the track, the roller drives the door body to move accordingly; the controller is used to control an operating status of the driving device, and the controller is provided with a wireless communication port; the wireless communication port is used to acquire a wireless control signal to remotely control the door body to move, wherein the smart barn door further comprises a tank chain, wherein the controller is connected to an external power supply by a wire; the wire is connected to the controller through the tank chain; and the tank chain is used to conceal and normatively arrange the wire.

2. The smart barn door according to claim 1, wherein a portion of the roller in contact with the track is provided with a textured structure; and the textured structure is used to increase a frictional force between the roller and the track, so as to improve movement stability of the door body.

3. The smart barn door according to claim 1, further comprising a Hall sensor, first magnets, and second magnets, wherein the Hall sensor is electrically connected to the controller and the Hall sensor moves with the door body; the second magnet is located at an endpoint of a route passed by the Hall sensor; there is a distance between the first magnet and the endpoint of the route passed by the Hall sensor; when the Hall sensor senses the first magnet during moving from the first magnet to the second magnet, the controller controls the driving device to decelerate; and when the Hall sensor senses the second magnet, the controller controls the driving device to stop.

4. A control method applied to a smart barn door, wherein the smart barn door comprises a door body, a controller, a driving device, a roller, and a track; the driving device and the roller are fixedly connected to the door body; the driving device is used to drive the roller to roll and to move along the track; when the roller moves along the track, the roller drives the door body to move accordingly; the controller is used to control an operating status of the driving device, and the controller is provided with a wireless communication port; the wireless communication port is used to acquire a wireless control signal to remotely control the door body to move; the control method comprises the following steps:

acquiring the wireless control signal;

detecting an operation instruction corresponding to the wireless control signal; and controlling, by the controller, the driving device to operate according to the operation instruction, wherein the smart barn door further comprises a Hall sensor, first magnets, and second magnets; the Hall sensor is electrically connected to the controller and the Hall sensor moves with the door body; the second magnet is located at an endpoint of a route passed by the Hall sensor; there is a distance between the first magnet and the endpoint of the route passed by the Hall sensor; each time the Hall sensor passes through the first magnet or the second magnet, a mark signal is generated and stored; the control method further comprises a buffering step:

controlling, by the controller, the driving device to stop when a second mark signal is detected, wherein the second mark signal is generated when the Hall sensor passes through the second magnet;

acquiring last detected signal information when a first mark signal is detected, wherein the first mark signal is generated when the Hall sensor passes through the first magnet; and controlling, by the controller, the driving device to decelerate when the last detected signal information is the first mark signal.

5. The control method according to claim 4, wherein the smart barn door further comprises a voice pickup device electrically connected to the controller, wherein the voice pickup device is used to acquire a sound; a preset voice instruction packet is stored in the controller, with each piece of voice information corresponding to a control mode; and the control method further comprises:

acquiring sound data information;

comparing the sound data information with the preset voice instruction packet; and controlling, by the controller, the driving device to operate according to a corresponding control mode when the sound data information matches at least one piece of information in the voice instruction packet.

6. A control device applied to a smart barn door, wherein the smart barn door comprises a door body, a controller, a driving device, a roller, and a track; the driving device and the roller are fixedly connected to the door body; the driving device is used to drive the roller to roll and to move along the track; when the roller moves along the track, the roller drives the door body to move accordingly; the controller is used to control an operating status of the driving device, and the controller is provided with a wireless communication port; the wireless communication port is used to acquire a wireless control signal to remotely control the door body to move; the control device comprises:

a first acquisition module, configured to acquire the wireless control signal;

a detection module, configured to detect an operation instruction corresponding to the wireless control signal; and an execution module, configured to control, by the controller, the driving device to operate according to the operation instruction, wherein the smart barn door further comprises a Hall sensor, first magnets, and second magnets; the Hall sensor is electrically connected to the controller and the Hall sensor moves with the door body: the second magnet is located at an endpoint of a route passed by the Hall sensor; there is a distance between the first magnet and the endpoint of the route passed by the Hall sensor; each time the Hall sensor passes through the first magnet or the second magnet, a mark signal is generated and stored; the control device further comprises:

a first control module, configured to control, by the controller, the driving device to stop when a second mark signal is detected, wherein the second mark signal is generated when the Hall sensor passes through the second magnet;

a second acquisition module, configured to acquire last detected signal information when a first mark signal is detected, wherein the first mark signal is generated when the Hall sensor passes through the first magnet; and a second control module, configured to control, by the controller, the driving device to decelerate when the last detected signal information is the first mark signal.

7. A computer-readable storage medium, wherein a computer program is stored on the computer-readable storage medium, and when the computer program is processed and executed, the control method according to claim 4 is implemented.

8. The computer-readable storage medium according to claim 7, wherein the smart barn door further comprises a voice pickup device electrically connected to the controller, wherein the voice pickup device is used to acquire a sound; a preset voice instruction packet is stored in the controller, with each piece of voice information corresponding to a control mode;

and the control method further comprises:

acquiring sound data information;

comparing the sound data information with the preset voice instruction packet; and controlling, by the controller, the driving device to operate according to a corresponding control mode when the sound data information matches at least one piece of information in the voice instruction packet.

* * * * *